United States Patent
Bastide et al.

(10) Patent No.: US 10,152,534 B2
(45) Date of Patent: Dec. 11, 2018

(54) MONITORING A CORPUS FOR CHANGES TO PREVIOUSLY PROVIDED ANSWERS TO QUESTIONS

(71) Applicant: International Business Machines Corporation, Armonk, NY (US)

(72) Inventors: Paul R. Bastide, Boxford, MA (US); Aaron M. Cohen, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 14/790,121

(22) Filed: Jul. 2, 2015

(65) Prior Publication Data
US 2017/0004204 A1    Jan. 5, 2017

(51) Int. Cl.
G06F 17/30    (2006.01)

(52) U.S. Cl.
CPC .............. *G06F 17/30654* (2013.01)

(58) Field of Classification Search
None
See application file for complete search history.

(56) References Cited

U.S. PATENT DOCUMENTS

| | | | |
|---|---|---|---|
| 5,751,378 A | 5/1998 | Chen et al. | |
| 6,071,236 A | 6/2000 | Iliff | |
| 6,542,889 B1 | 4/2003 | Aggarwal et al. | |
| 7,225,187 B2 | 5/2007 | Dumais et al. | |
| 7,295,965 B2 | 11/2007 | Haigh et al. | |
| 7,594,176 B1 * | 9/2009 | English | G06F 9/453 715/708 |
| 7,743,340 B2 | 6/2010 | Horvitz et al. | |
| 7,945,525 B2 | 5/2011 | Ananthanarayanan et al. | |

(Continued)

FOREIGN PATENT DOCUMENTS

| | | |
|---|---|---|
| WO | WO02/29618 A1 | 4/2002 |
| WO | WO2002/029618 A1 | 4/2002 |

(Continued)

OTHER PUBLICATIONS

"List of IBM Patents or Patent Applications Treated as Related", 2 pages.

(Continued)

*Primary Examiner* — Son T Hoang
(74) *Attorney, Agent, or Firm* — Stephen J. Walder, Jr.; Diana R. Gerhardt

(57) ABSTRACT

Mechanisms are provided for identifying changes, within a corpus of information, to answers to questions provided within the corpus of information. A mapping of a question and a previously provided answer to the question in a question/answer data structure is generated. A transaction referencing the previously provided answer, and having an update to the previously provided answer, is received and correlated with the question/answer data structure, which is updated based on the transaction. A determination is made as to whether the strength of the mapping of the first question to the previously provided answer based on the update to the question/answer data structure has fallen equal to or below a predetermined threshold. In response to this being the case, a change to the previously provided answer is propagated throughout the corpus of information.

17 Claims, 5 Drawing Sheets

(56) References Cited

U.S. PATENT DOCUMENTS

| | | |
|---|---|---|
| 7,958,457 B1 | 6/2011 | Brandenberg et al. |
| 8,254,685 B2 | 8/2012 | Greene et al. |
| 8,275,803 B2 | 9/2012 | Brown et al. |
| 8,402,054 B2 | 3/2013 | Frazier et al. |
| 8,510,296 B2 | 8/2013 | Fan et al. |
| 8,538,744 B2 | 9/2013 | Roberts et al. |
| 8,555,281 B1 | 10/2013 | van Dijk et al. |
| 8,600,986 B2 | 12/2013 | Fan et al. |
| 8,626,784 B2 | 1/2014 | Beaudreau et al. |
| 8,636,515 B2 | 1/2014 | Burgin et al. |
| 8,706,653 B2 | 4/2014 | Kasneci et al. |
| 8,935,277 B2 | 1/2015 | Kuchmann-Beauger et al. |
| 9,558,507 B2 | 1/2017 | Zilkha |
| 9,582,757 B1 | 2/2017 | Holmes et al. |
| 2006/0246410 A1 | 11/2006 | Iwayama |
| 2008/0104065 A1* | 5/2008 | Agarwal ............... G06Q 10/10 |
| 2009/0287678 A1 | 11/2009 | Brown et al. |
| 2010/0281091 A1 | 11/2010 | Wakao et al. |
| 2011/0066587 A1 | 3/2011 | Ferrucci et al. |
| 2011/0125734 A1 | 5/2011 | Duboue et al. |
| 2011/0125844 A1 | 5/2011 | Collier et al. |
| 2012/0065480 A1 | 3/2012 | Badilini et al. |
| 2012/0078837 A1* | 3/2012 | Bagchi ................... A61B 5/00 706/52 |
| 2012/0078873 A1 | 3/2012 | Ferrucci et al. |
| 2012/0078890 A1 | 3/2012 | Fan et al. |
| 2012/0191716 A1 | 7/2012 | Omoigui |
| 2013/0007037 A1 | 1/2013 | Azzam et al. |
| 2013/0007055 A1 | 1/2013 | Brown et al. |
| 2013/0017524 A1 | 1/2013 | Barborak et al. |
| 2013/0018652 A1 | 1/2013 | Ferrucci et al. |
| 2013/0029307 A1 | 1/2013 | Ni et al. |
| 2013/0041921 A1 | 2/2013 | Cooper et al. |
| 2013/0052630 A1 | 2/2013 | Mine et al. |
| 2013/0066886 A1 | 3/2013 | Bagchi et al. |
| 2013/0097110 A1 | 4/2013 | Kwon |
| 2013/0103382 A1 | 4/2013 | Kim et al. |
| 2013/0111348 A1 | 5/2013 | Gruber et al. |
| 2013/0218914 A1 | 8/2013 | Stavrianou et al. |
| 2013/0226453 A1 | 8/2013 | Trussel et al. |
| 2013/0304730 A1 | 11/2013 | Zhou |
| 2014/0012909 A1 | 1/2014 | Sankar et al. |
| 2014/0058766 A1 | 2/2014 | Yu et al. |
| 2014/0058986 A1 | 2/2014 | Boss et al. |
| 2014/0172880 A1 | 6/2014 | Clark et al. |
| 2014/0172882 A1 | 6/2014 | Clark et al. |
| 2014/0172883 A1* | 6/2014 | Clark ............... G06F 17/30038 707/749 |
| 2014/0272884 A1 | 9/2014 | Allen et al. |
| 2014/0280292 A1 | 9/2014 | Skinder |
| 2015/0277996 A1 | 10/2015 | Bank et al. |
| 2015/0290531 A1 | 10/2015 | Herz et al. |
| 2015/0351655 A1 | 12/2015 | Coleman |
| 2015/0356146 A1 | 12/2015 | Yamashita et al. |
| 2016/0034457 A1 | 2/2016 | Bradley et al. |
| 2016/0155058 A1 | 6/2016 | Oh et al. |
| 2016/0196299 A1 | 7/2016 | Allen et al. |
| 2016/0246929 A1 | 8/2016 | Zenati et al. |
| 2016/0342694 A1 | 11/2016 | Allen et al. |
| 2016/0342900 A1 | 11/2016 | Allen et al. |
| 2017/0109390 A1 | 4/2017 | Bradley et al. |
| 2017/0132313 A1 | 5/2017 | Kukla et al. |
| 2017/0147982 A1 | 5/2017 | Reich et al. |
| 2017/0161685 A1* | 6/2017 | Jennings ............ G06Q 10/1053 |

FOREIGN PATENT DOCUMENTS

| | | |
|---|---|---|
| WO | WO2011/065617 A1 | 6/2011 |
| WO | WO2012/122196 A2 | 9/2012 |
| WO | WO2013/192584 A1 | 12/2013 |

OTHER PUBLICATIONS

"Apache ODF Toolkit (incubating)", The Apache Software Foundation, http://incubator.apache.org/odftoolkit/odfdom/index.html, accessed online Mar. 12, 2015, 2 pages.

"Ignoring SSL certificate in Apache HttpClient 4.3", Stack Overflow, http://stackoverflow.com/questions/19517538/ignoring-ssl-certificate-in-apache-httpclient-4-3, accessed online Mar. 12, 2015, 5 pages.

"Microsoft Office—Tools to Get Work Done", Microsoft Corporation, http://office.microsoft.com/en-us/, accessed online Mar. 12, 2015, 5 pages.

"Natural language processing", Wikipedia, http://en.wikipedia.org/wiki/Natural_language_processing, last modified Mar. 10, 2015, accessed online Mar. 12, 2015, 12 pages.

"Oracle Outside in Technology", Oracle Corporation, http://www.oracle.com/us/technologies/embedded/025613.htm, accessed online Mar. 12, 2015, 2 pages.

"SPSS Statistics", IBM Corporation, http://www-01.ibm.com/software/analytics/spss/products/statistics/, accessed online Mar. 12, 2015, 2 pages.

"SPSS Text Analytics for Surveys", IBM Corporation, http://www-01.ibm.com/software/analytics/spss/products/statistics/text-analytics-for-surveys/, accessed online Mar. 12, 2015, 2 pages.

High, Rob, "The Era of Cognitive Systems: An Inside Look at IBM Watson and How it Works", IBM Corporation, Redbooks, Dec. 12, 2012, 16 pages.

Li, Fangtao et al., "Answer Validation by Information Distance Calculation", Coling 2008: Proceedings of the 2nd Workshop on Information Retrieval for Question Answering (IR4QA), Aug. 2008, pp. 42-29.

Magnini, Bernardo et al., "Is it the Right Answer? Exploiting Web Redundancy for Answer Validation", Proceedings of the 40th Annual Meeting of the Association for Computational Linguistics (ACL), Philadelphia, Jul. 2002, pp. 425-432.

McCord, M.C. et al., "Deep parsing in Watson", IBM J. Res. & Dev. vol. 56 No. 3/4 Paper 3, May/Jul. 2012, pp. 3:1-3:15.

Oliver, Andrew et al., "Apache POI—the Java API for Microsoft Documents", The Apache Software Foundation, http://poi.apache.org/, accessed online Mar. 12, 2015, 2 pages.

Yuan, Michael J., "Watson and healthcare, How natural language processing and semantic search could revolutionize clinical decision support", IBM developerWorks, IBM Corporation, Apr. 12, 2011, 14 pages.

"List of IBM Patents or Patent Applications Treated as Related", Oct. 28, 2015, 2 pages.

Allen, Corville et al., "Determining Temporal Categories for a Domain of Content for Natural Language Processing", filed Jun. 5, 2014, U.S. Appl. No. 14/297,335.

Allen, Corville et al., "Time-Based Optimization of Answer Generation in a Question and Answer System", filed Jun. 5, 2014, U.S. Appl. No. 14/297,267.

"List of IBM Patents or Patent Applications Treated as Related", Aug. 12, 2015, 2 pages.

"Method and System for Managing Cases When an Answer Changes in a Question Answering System", IP.com, IP.com No. 000237471, Jun. 18, 2014, 3 pages.

\* cited by examiner

MONITORING A CORPUS FOR CHANGES TO PREVIOUSLY PROVIDED ANSWERS TO QUESTIONS

BACKGROUND

The present application relates generally to an improved data processing apparatus and method and more specifically to mechanisms for monitoring a corpus of information for changes to previously provided answers to questions.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana® from Microsoft®, and question answering pipeline of the IBM Watson™ cognitive system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

In one illustrative embodiment, a method is provided, in a data processing system comprising a processor and a memory, for identifying changes, within a corpus of information, to answers to questions provided within the corpus of information. The method comprises registering, by the data processing system, a mapping of a first question and a previously provided answer to the first question in a question/answer data structure. The method further comprises receiving, by the data processing system, a transaction referencing the previously provided answer and having an update to the previously provided answer. Moreover, the method comprises correlating, by the data processing system, the transaction with the question/answer data structure and updating the question/answer data structure based on the transaction. In addition, the method comprises determining, by the data processing system, whether a strength of the mapping of the first question to the previously provided answer based on the update to the question/answer data structure has fallen equal to or below a predetermined threshold. Furthermore, the method comprises propagating, by the data processing system, a change to the previously provided answer throughout the corpus of information in response to the strength of the mapping of the first question falling equal to or below the predetermined threshold.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
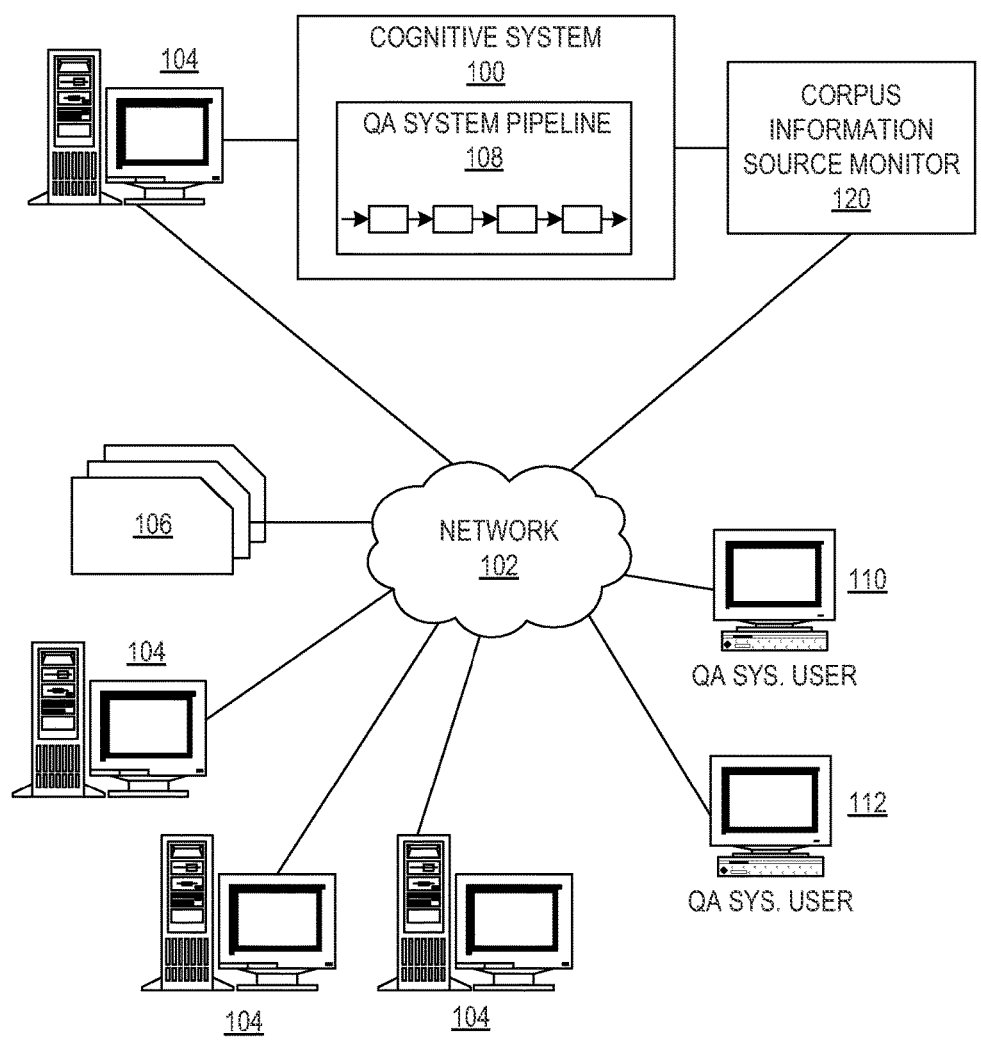
FIG. 1 depicts a schematic diagram of one illustrative embodiment of a question/answer creation (QA) system in a computer network.

The illustrative embodiments provide mechanisms for monitoring a corpus of information to identify changes to answers to questions previously provided within the corpus of information. For example, often times in a social networking environment, a user will ask the community a question and receive one or more answers from other members of the community, e.g., Question—When is the best time to travel to Disney World?; Answer—Second week in February. This is provided in the corpus of information itself which can then be used by cognitive systems to generate responses to requests from users. For example, a user of a cognitive system may ask the cognitive system, "when is the best time to travel to Disney World?" and the cognitive system may analyze a corpus of information, which may include the posts to the social network environment mentioned above, in an attempt to answer the question. However, problems arise in that in such dynamic corpora, answers within the corpora often change over time as providers of information, e.g., other users of the social network, forum, or the like, add their own content to the corpora.

The changes to the answers may take many different forms including "like," "dislike," "thumbs up," "thumbs down" votes, comments on the previous answer, an explicit change in the answer, or the like. It should be noted that these are changes within the corpus itself to questions that are present in the corpus. For example, in an online forum, a user may ask the online community "Is New York city a fun place to visit?" and a corresponding answer of "Yes" may be provided with a number of other users giving this answer a "thumbs up" vote. As more users provide comments, thumbs up or thumbs down votes, or the like, the answer changes over time. Thus, while the answer may be a strong "Yes" in one year, in following years the answer may change as more users provide comments, add their own thumbs up/down votes, or otherwise provide feedback on the previous answer.

A mapping of a previous answer to the question may be checked to determine the strength of the mapping, where the strength of the mapping is based on an amount of evidence indicating that the answer is correct for the particular question, e.g., a relatively large number of thumbs up votes is indicative of a correct answer (stronger answer) while a relatively large number of thumbs down votes is indicative of an incorrect answer (weaker answer), taking into consideration the temporal aspects of the thumbs up/down votes (100,000 votes 2 years in the past is not as strong an indicator as 1000 thumbs down votes in the last 2 months). If the strength is determined to be relatively weak, then a change to the answer may be propagated using the mechanism of the illustrative embodiments.

In one illustrative embodiment, the use of, viewing of, interaction with, or any other accessing of answers to submitted questions in transactions in an electronic environment is tracked such that when a change to an answer is detected, the impact of that change on these previous transactions is determined and actions can be taken with regard to each of these transactions to reflect the update to the answer, e.g., updating an online forum, contacting users that previously used the previous answer to inform them of the update to the answer, or the like. For example, users that previously performed transactions to give an answer a "thumbs up" vote may be informed when the trend of the answer becomes such that the answer is no longer strongly associated, or mapped, with the question, e.g., more than a threshold number of "thumbs down" votes are received for the answer, a comment is added to the answer indicating that the answer, while previously correct, is no longer correct, or the like.

In some illustrative embodiments, the mechanisms of the illustrative embodiments augment known question and answer (QA) systems, such as the IBM Watson™ QA system available for International Business Machines (IBM) Corporation of Armonk, N.Y. That is, the QA system may process a question to generate a correct answer for the question at the time that the question is posed to the QA system. The mechanisms of the illustrative embodiments may further monitor the answer to the question provided in the corpus of information used to generate the answer and determine if the answer to the question has changed in the corpus, as well as monitor transactions that reference this answer. As the answer changes, or trends towards a different answer, the affects of these changes in previous transactions may be determined and updates, notifications, and the like, generated.

Thus, the illustrative embodiments provide mechanisms for improving the operation of QA systems, unstructured information systems, and other cognitive systems with regard to advising users regarding their requests for information. The information sources themselves are critical to providing correct information to users of such systems. The illustrative embodiments monitor such information sources, the transactions performed in such information sources with regard to answers to questions provided in the information sources, and propagate changes to answers within the information sources and to users of the information sources based on previous transactions that reference the previous answers to the questions. The illustrative embodiments address the issues associated with transactions within a corpus of information being finite and answers changing as new information is received or discovered.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
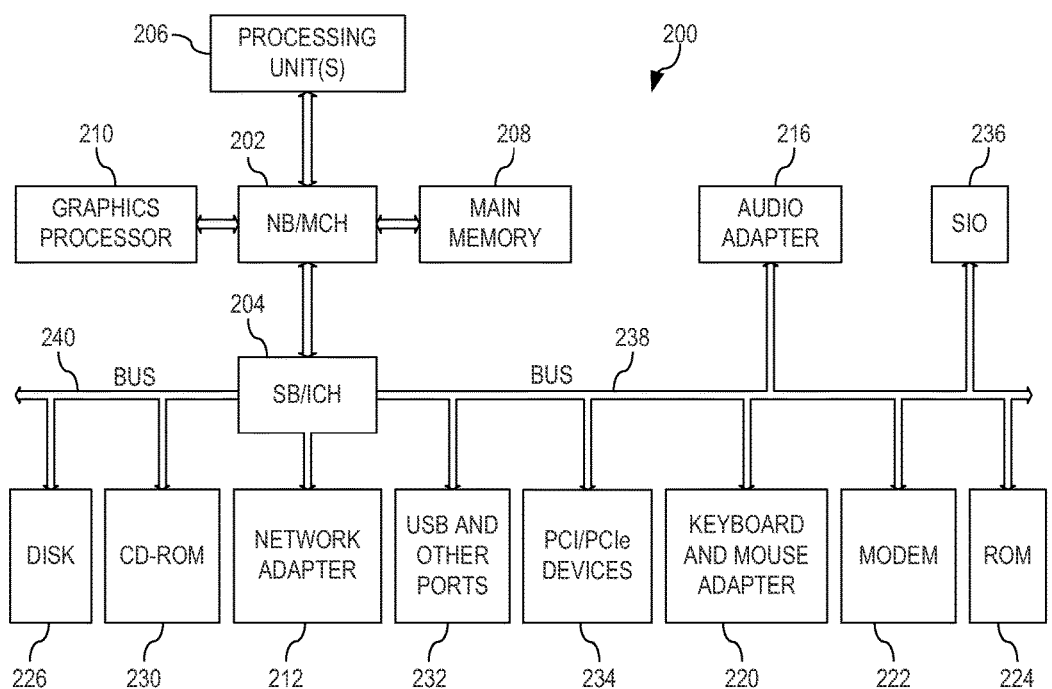
FIG. 2 is a block diagram of an example data processing system in which aspects of the illustrative embodiments are implemented.
Figure 3:
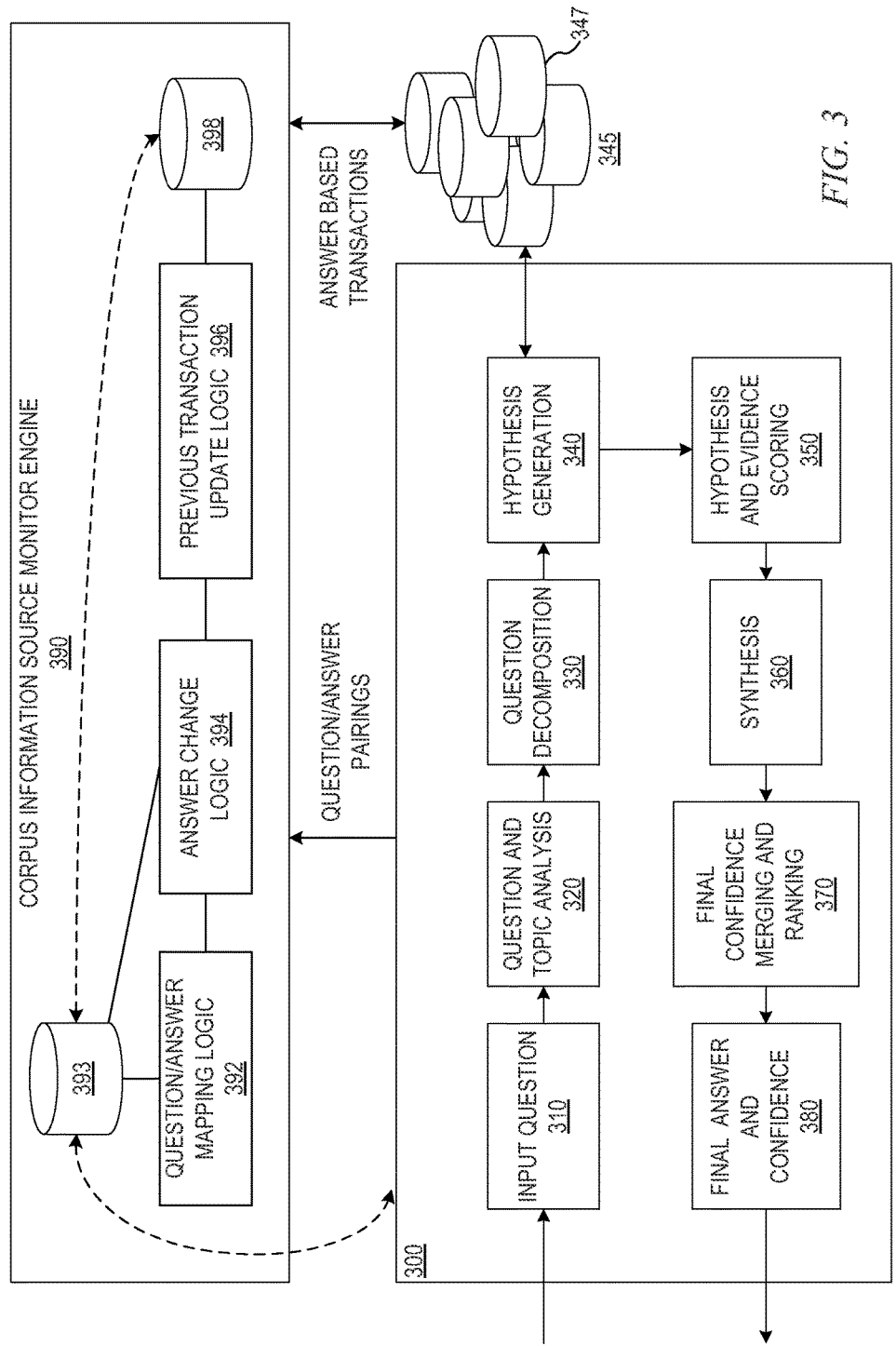
FIG. 3 illustrates a QA system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system implementing a Question Answering (QA) pipeline (also referred to as a Question/Answer pipeline or Question and Answer pipeline), methodology, and computer program product with which the mechanisms of the illustrative embodiments are implemented. As will be discussed in greater detail hereafter, the illustrative embodiments are integrated in, augment, and extend the functionality of the cognitive system, and/or the QA mechanisms of the cognitive system, with regard to monitoring the corpus or corpora of information utilized by the cognitive system for changes to answers previously provided within the corpus or corpora. Moreover, the mechanisms of the illustrative embodiments further augment the cognitive system and/or QA mechanisms to track transactions that reference the answers previously provided within the corpus/corpora so that appropriate actions, updates, and the like, may be made within the corpus/corpora and with regard to other users of the previously provided answers.

As noted above, in some illustrative embodiments, the mechanisms of the illustrative embodiments are used in conjunction with a cognitive system comprising one or more QA pipelines. Thus, in order to provide a context for the description of the mechanisms of these illustrative embodiments, it is important to first have an understanding of how question and answer creation in a cognitive system implementing a QA pipeline is implemented before describing how the mechanisms of the illustrative embodiments are integrated in and augment such QA mechanisms. It should be appreciated that the QA mechanisms described in FIGS. 1-3 are only examples and are not intended to state or imply any limitation with regard to the type of QA mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding

Ingest and process vast amounts of structured and unstructured data

Generate and evaluate hypothesis

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situational awareness that mimic human cognition based on experiences Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a question answering (QA) pipeline 108 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables question/answer (QA) generation functionality for one or more cognitive system users via their respective computing devices 110-112. Other embodiments of the cognitive system 100 may be used with components, systems, subsystems, and/or devices other than those that are depicted herein.

The cognitive system 100 is configured to implement a QA pipeline 108 that receive inputs from various sources. For example, the cognitive system 100 receives input from the network 102, a corpus of electronic documents 106, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 106 for use as part of a corpus of data with the cognitive system 100. The document includes any file, text, article, or source of data for use in the cognitive system 100. QA system users access the cognitive system 100 via a network connection or an Internet connection to the network 102, and input questions to the cognitive system 100 that are answered by the content in the corpus of data 106. In one embodiment, the questions are formed using natural language. The cognitive system 100 parses and interprets the question via a QA pipeline 108, and provides a response to the cognitive system user, e.g., cognitive system user 110, containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 106. The QA pipeline 108 generates answers for the input question based on the processing of the input question and the corpus of data 106. The QA pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question which it then parses to extract the major features of the question, which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e. candidate answer, is inferred by the question. This process is be repeated for each of the candidate answers to generate a ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for implementing a corpus information source monitor 120 that operates on the corpus/corpora of information utilized by the cognitive system 100, and the QA system pipeline 108, to identify and track changes to answers to questions presented within the corpus/corpora, i.e. as part of one or more natural language documents, portion of natural language text, or the like.

The corpus information source monitor 120 comprises logic that analyzes the natural language content of a source, e.g., a social networking website, an online forum, a collection of electronic documents, or the like, and identifies pairings of questions and answers within content of the source. In one illustrative embodiment, the source may be an entire corpus of information obtained from the same or different sources, the source may be a plurality of corpora, or the like. In one illustrative embodiment, the corpus information source monitor 120 analyzes non-automated transactions performed with regard to a source to identify such mappings of questions and answers, e.g., a first user's posting of a question to an electronic environment such as a social networking website, an online forum, or the like, followed by one or more other users posting responses to the question offering questions and/or supporting/refuting answers provided by other users. For example, a first transaction may be that a first user posts the question "What is the best time to go to Disney World?" A second transaction may be that a second user posts an answer of "Second week in February". A third transaction may be that a third user posts an answer of "After Thanksgiving." A fourth transaction may be that a fourth user submits a "thumbs up" vote for the answer provided in the second transaction. A fifth transaction may be that a fifth user submits a "thumbs down" vote for the answer provided by the third transaction, and so on.

A mapping of a previous answer to a question within the corpus/corpora may be stored in a question/answer pair mapping data structure 130, optionally with a pointer to the location of the question/answer pair in the corpus/corpora. As the corpus/corpora is dynamically changed, e.g., such as by additional automated/non-automated transactions being processed, the transactions are detected and the changes implemented by these transactions are analyzed to determine an updated strength of the mapping of the previous answer to the question corresponding to the transaction, where the strength of the mapping is again based on an amount of evidence indicating that the answer is correct for the particular question, e.g., a relatively large number of thumbs up votes is indicative of a correct answer (stronger answer) while a relatively large number of thumbs down votes is indicative of an incorrect answer (weaker answer). Changes may be detected as a change in the number of positive/negative votes associated with the answer, e.g., thumbs up/down, likes/dislikes, re-tweets, or any other quantitative measure of positive/negative feedback regarding the answer.

Changes may also be detected by analyzing natural language comments provided referencing the answer and/or question. For example, comments provided in connection with the answer and/or question, that are provided in subsequent transactions, may be analyzed to identify keywords, key phrases, lexical answer type (LAT), focus, or any other semantic or syntactic evidence of positive/negative reinforcement of the answer for the question. For example, a subsequent comment to a previously provided answer to a question may indicate that the answer was correct before but that there has been a change and the answer is no longer correct, e.g., a statement of the type "connections via plain http do not work any longer. You have to add a PlainConnectionSocketFactory for the http protocol to make them work again" has keywords and key phrases, such as "do not work any longer" and "work again" that are indicative of a change that renders the previous answer less correct than it was before and thus, there is a large indication that the strength of the previous answer to question mapping should be reduced.

In some illustrative embodiments, similar questions/answers provided in other portions of the corpus/corpora may be identified through natural language processing techniques and correlated with the question/answer pairing. Similarity may be measured in terms of similar key words, similar key phrases, similar lexical answer type (LAT), similar focus, similarity in concepts, etc. in one or both of the questions and the answers. Any known, or later developed, mechanism for identifying similar questions/answers may be used without departing from the spirit and scope of the illustrative embodiments. If a similar question is identified in another portion of the corpus/corpora and the answer to the similar question is different from the answer in the current question/answer pair, then this is an indication of a potential strength downgrade, or reduction in positive feedback/increase in negative feedback, for the question/answer pair. If the similar question is identified in another portion of the corpus/corpora and the answer to the similar question is substantially the same as the answer in the current question/answer pair, then this is an indication of a potential strength upgrade, or increase in positive feedback, for the question/answer pair.

In some illustrative embodiments, temporal characteristics of transactions, e.g., timestamps associated with the transactions, may be evaluated to determine the effect of changes to answers in the corpus/corpora. For example, based on the timestamps associated with the various transactions, a determination may be made as to whether more time has elapsed since a positive change (increase in strength), e.g., a user providing positive feedback such as a "thumbs up" vote or the like, has been provided for an answer than a negative change (decrease in strength), e.g., a user providing negative feedback such as a "thumbs down" vote or the like. In such a case, the corpus information source monitor 120 of the illustrative embodiments may determine that the trend of the question/answer pair is trending towards a reduction in the strength of the mapping of the question/answer pair. Similarly, if a predetermined threshold period of time has elapsed since a last positive change to the answer was made by a subsequent transaction, then this may be indicative of a lessening of the strength of the question/answer mapping. Thus, temporal characteristics of transactions referencing the answer in the question/answer pair may be used as a further aspect for calculating a strength of the question/answer pair mapping.

Of course it should be appreciated that any combination of these types of analysis may be used by the corpus information source monitor 120 without departing from the spirit and scope of the illustrative embodiments. That is, numerical counts of positive/negative votes, analysis of natural language comments for indications of positive/negative reinforcement of an answer, differences or similarities in answers for similar questions in different portions of the corpus/corpora, and temporal characteristics of transactions referencing the answer may all be used to provide contributions to a calculation of the strength of the mapping between the answer and the question. The calculation may utilize different weighting factors to be applied to each contributing part of the calculation where the weights are determined empirically based on a desired emphasis on different types of analysis. For example, a first weight may be applied to the numerical counts of positive/negative votes that more heavily weights this factor in the calculation of a strength of the mapping than temporal characteristics of the transactions which may be given a relatively smaller second weight.

The results of the analysis of the changes made by the transaction are quantified as either a positive or negative change in the strength of the mapping of the answer to the question. For example, if 10 people give an answer a "thumbs up" through subsequent transactions, then the strength of the mapping of the answer to the question is increased to indicate that there is a stronger mapping between the answer and the question. If 10 people give the answer a "thumbs down" through subsequent transactions, then the strength of the mapping of the answer to the question is decreased. Similarly, if comments are provided by a user indicating that the answer may no longer be valid, as may be determined through natural language processing of the comments, e.g., keyword identification, key phrase identification, lexical answer type (LAT) identification, focus identification, and other natural language processing techniques, then the strength of the mapping between the previously provided answer and the question may be reduced. Ultimately, a measure of the strength of the mapping between the question and the previously provided answer to the question is quantified such that it can be used to determine whether the strength is relatively strong or weak. Where the strength is relatively weak, an action is taken as discussed hereafter.

The strength of the mapping of the question and answer may be compared to one or more threshold values to determine whether or not the mapping is relatively weak or relatively strong. If the current strength is determined to be relatively weak, then one or more actions may be taken by the corpus information source monitor 120 to propagate the change to the answer within the corpus/corpora and to users that may have relied previously on the answer. The portions of the corpus/corpora that reference the previous answer to the question and which need to be updated to propagate the change in the answer may be identified in many ways. For example, pairings of answers with previously submitted questions may be generated when the questions were answered and these pairings may be maintained. In some illustrative embodiments, a search over the corpus may be performed in response to the detected change in the answer to thereby identify other usage of the previous answer. The particular users that accessed the answers may be stored in a data structure and used to perform update notification. Other mechanisms for identifying where and how to propagate a change in the answer may be used without departing from the spirit and scope of the illustrative embodiments.

In this way, the corpus information source monitor 120 may identify previous answers to questions provided in the corpus/corpora that previously had a strong mapping between the question and the answer, and which currently has a relatively weak mapping between the question and answer due to additional transactions occurring referencing the answer to the question over time. Moreover, by propagating the change to the answer using the mechanisms of the illustrative embodiments, other portions of the corpus/corpora that make use of the answer, users that received the answer as a correct answer for the question, and the like, may be updated to reflect the current status of the question and answer mapping.

The actions that are taken may take many different forms depending on the particular implementation. In one illustrative embodiment, the corpus/corpora itself may be changed in other places within the corpus/corpora so as to reflect the change in the answer to the question. In some illustrative embodiments, notifications are sent to the users that referenced the previous answer to the question. In still other illustrative embodiments, the electronic community, e.g., a social networking website, online forum, or the like, may be automatically updated with the change to the answer, e.g., providing the new answer to the question if there is a new answer.

Thus, in one illustrative embodiment, the use of, viewing of, interaction with, or any other accessing of answers to submitted questions in transactions in an electronic environment is tracked by the corpus information source monitor 120 such that when a change to an answer is detected, the impact of that change on these previous transactions is determined and actions can be taken with regard to each of these transactions to reflect the update to the answer, e.g., updating an online forum, contacting users that previously used the previous answer to inform them of the update to the answer, or the like. For example, users that previously performed transactions to give an answer a "thumbs up" vote may be informed when the trend of the answer becomes such that the answer is no longer strongly associated, or mapped, with the question, e.g., more than a threshold number of "thumbs down" votes are received for the answer, a comment is added to the answer indicating that the answer, while previously correct, is no longer correct, or the like.

Thus, a transaction history may be maintained in association with question/answer pairs, that has pointers to transactions performed by users such that the transaction history may be traversed to identify users to which notifications of a change in the answer within the corpus/corpora has been made that renders the previous answer/question mapping relatively weak, e.g., a notification can be sent to the user stating that "The previous answer to the question 'how do you ignore SSL certificates for Apache HttpClient 4.3?' of 'use a plain http connection' has changed. The new answer is to 'add a PlainConnectionSocketFactory'."

In some illustrative embodiments, the notifications of the change in the answer may be accompanied with a request from users to confirm or refute the change. The confirmation/refute responses may be evaluated to determine if the users of the previous answer agree with the change prior to the change being propagated within the corpus/corpora. If the response is a general confirmation, e.g., more confirmations than refutes, then the change may be propagated. If the response is a general refute of the change, then the change may not be propagated. If there is no clear indication either way, then the change may not be propagated but will undergo further development, potentially notifying an authorized user so that they can research the answer further and determine whether to propagate the new answer or not.

In propagating the change in the previous answer, the corpus information source monitor 120 may identify other places in the corpus/corpora where this question/previous answer pair are referenced and may update these portions of the corpus/corpora with the new answer. These other places in the corpus/corpora may be identified via identification of explicit references to the question/previous answer pair location, e.g., hypertext links, pointers, or the like, identifications of similarity in natural language content, or the use of any other mechanisms for identifying references to one another between portions of natural language content.

In some illustrative embodiments, the mechanisms of the illustrative embodiments augment known question and answer (QA) systems, such as the IBM Watson™ QA system available for International Business Machines (IBM) Corporation of Armonk, N.Y. That is, the QA system may process a question to generate a correct answer for the question at the time that the question is posed to the QA system. The mechanisms of the illustrative embodiments may further monitor the answer to the question provided in the corpus of information used to generate the answer and determine if the answer to the question has changed in the corpus, as well as monitor transactions that reference this answer. As the answer changes, or trends towards a different answer, the effects of these changes in previous transactions may be determined and updates, notifications, and the like, generated and output to users as well as propagation of the changes within the corpus/corpora may be performed.

Thus, the illustrative embodiments provide mechanisms for improving the operation of QA systems, unstructured information systems, and other cognitive systems with regard to advising users regarding their requests for information. The information sources themselves are critical to providing correct information to users of such systems. The illustrative embodiments monitor such information sources, the transactions performed in such information sources with regard to answers to questions provided in the information sources, and propagate changes to answers within the information sources and to users of the information sources based on previous transactions that reference the previous answers to the questions. The illustrative embodiments address the issues associated with transactions within a corpus of information being finite and answers changing as new information is received or discovered. In this way, the use of the corpus/corpora by the QA system is modified by the operations of the illustrative embodiments such that the QA system is able to provide answers to questions with increased confidence due to the updating of the answers dynamically within the corpus/corpora. Moreover, users of the QA system may be automatically updated when changes to the corpus/corpora occur that affect previous answers to questions that were submitted or utilized by the user via the QA system.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline, of a cognitive system, for processing an input question in accordance with one illustrative embodiment. The QA system pipeline of FIG. 3 may be implemented, for example, as QA pipeline 108 of cognitive system 100 in FIG. 1. It should be appreciated that the stages of the QA pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA pipeline 300 comprises a plurality of stages 310-380 through which the cognitive system operates to analyze an input question and generate a final response. In an initial question input stage 310, the QA pipeline 300 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA pipeline 300 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 300 that identifies a manner by which these scores may be combined to generate a confidence score or measure for the individual hypotheses or candidate answers. This confidence score or measure summarizes the level of confidence that the QA pipeline 300 has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

As shown in FIG. 3, in accordance with one illustrative embodiment, the QA system pipeline 300 operates in conjunction with a corpus information source monitor engine 390, which may be the corpus information source monitor 120 in FIG. 1, for example. The corpus information source monitor engine 390 comprises question/answer mapping logic 392, a question/answer pair tracking data storage 393, answer change logic 394, previous transaction update logic 396, and answer transaction tracking data storage 398. Each of the elements 392-398 in corpus information source monitor engine 390 may be implemented in software executed on data processing system hardware (processors, memory, storage devices, etc.), specialized hardware, such as an Application Specific Integrated Circuit (ASIC), firmware, or the like, or any combination of software executed on data processing system hardware and specialized hardware. The data storages 393 and 398 may be implemented in a memory, hard disk, optical disk, or any other currently known or later developed data storage device. Although shown as separate in FIG. 3 for purposes of illustration, it should be appreciated that the corpus information source monitor engine 390, or elements of the corpus information source monitor engine 390, may instead be integrated into the QA system pipeline 300, such as additional logic provided in one or more of stages 310-380 or as additional stages of the QA system pipeline 300.

The corpus information source monitor engine 390 may operate based on question/answer pairings provided as results from the QA system pipeline 300, may operate directly on the corpus/corpora 345, 347 to identify dynamic changes to previously provided answers to questions within the corpus/corpora 345, 347, via answer based transaction monitoring, and/or a combination of both. In one illustrative embodiment, question and answer pairings are generated by the QA system pipeline 300 and stored in the question/answer pair tracking data storage 393 as an entry in a data structure of the data storage 393. The entry may comprise an identifier of the question, an identifier of the answer, features extracted from the question, such as during stage 320, identifiers of evidence information obtained during hypothesis generation 340 or scoring 350, a confidence measure associated with the answer, and the any other information generated by the QA system pipeline 300 during processing of the input question 310 and generation of the answer result that would be relevant to identifying answer changes in the corpus/corpora 345, 347 (hereafter referred to simply as the corpus 345 and propagating such changes within the corpus 345 and to users of the previously provided answer.

In addition, or alternatively, the corpus information source monitor engine 390 may identify question/answer pairs within the corpus 345 itself, where the questions may not have been processed by the QA system pipeline 300. For example, the corpus 345 may comprise natural language text posted to an online forum, social networking website, or the like, and thus, these posts may include questions answered by other members of the electronic community to which the posts were submitted. These questions were not processed by the QA system pipeline 300 for answering, but instead exist within the corpus 345. The identification of these question/answer pairs may be performed, for example, during an ingestion of the corpus 345, during a separate analysis stage for pre-processing the corpus 345 to identify such question/answer pairs, or the like. Moreover, such question/answer pairs may be identified dynamically as transactions are performed with regard to a source of information in the corpus 345, e.g., a social networking website, online forum, or the like. Thus, as a user performs a transaction by posting a message to the source, this transaction may be processed using natural language processing to identify whether or not the transaction is a question and whether or not an answer has been provided to the question.

In either case, an entry into the question/answer pair tracking data storage 393 is generated. The entry may further include pointers to the location of the question/answer pair in the corpus 345, transaction identifiers associated with the question/answer or the like, so that the question/answer pair may be identified in the corpus 345, changes to the answer may be correlated with the previous answer in the data storage 393, and the like. In one illustrative embodiment, such correlation is performed with regard to transaction identifiers or other unique identifiers associated with posts or entries in the content of the source within the corpus 345, in which the question and/or answer are provided. For example, each post to an online forum may have a unique identifier associated with the post and this unique identifier may be included in the entry in the data storage 393 for posts that have a question associated with them. Answers to the question are tied to the post having the question, such as sub-posts or the like, and thus, the question is able to be correlated with the answer. Similarly, user changes and comments to an answer may be correlated using the unique identifier of the post having the previously provided answer.

The question/answer mapping logic 392 provides the primary logic for correlating answers with questions and storing the correlated question/answer pairs in the data storage 393, along with any attributes, extracted features, confidence values, positive/negative vote counts, and the like. As mentioned above, these questions/answers may be obtained from the QA system pipeline 300 and/or analysis of the corpus 345 itself for questions and their related answers. Moreover, questions/answers may be identified through related transactions identified in the corpus 345.

The answer change logic 394 receives answer based transactions from the corpus/corpora 345 sources and accesses the corresponding question/answer mapping data structures in the data store 393 either directly or via the question/answer mapping logic 392. As the corpus/corpora is dynamically changed, e.g., such as by additional automated/non-automated transactions being processed by sources that are part of the corpus 345, e.g., social networking websites, online forums, document databases that are updated dynamically, or the like, the transactions are detected and correlated with entries in the data storage 393. Various mechanisms may be used to detect the occurrence of these transactions including cache-control mechanisms for the source, update notification services, application programming interfaces (APIs) which generate notifications upon create-update-delete actions, "crawling" the source to identify changes through comparison with previous "crawls", etc.

In one illustrative embodiment, agent mechanisms may be deployed in the computing device(s) of the information sources so that the agents monitor activity within the computing device(s) of the information source (hereafter referred to simply as the "source" or "information source") to identify transactions and report those transactions to the corpus information source monitor engine 390 via one or more transaction report messages. In another illustrative embodiment, changes are detected when the same or similar question is submitted to the QA system pipeline 300 and a new/different answer is generated. In yet another illustrative embodiment, the answer change logic 394 may periodically submit requests to the sources in the corpus to provide transactions that have occurred, e.g., a transaction log, since a last request was submitted to them by the answer change logic 394. Any mechanism for detecting changes/updates to answers within a corpus 345 may be used without departing from the spirit and scope of the illustrative embodiments.

The changes/updates to the answer are correlated with the question/answer entries in the question/answer mapping data storage 393 either directly or via the question/answer mapping logic 392 which may perform a lookup of the unique identifiers associated with the changes/updates to find matching entries within the data storage 393. Information in a matching entry of the data storage 393 may be updated based on the change/update to the answer. For example, if the entry in the data storage 393 maintains a count of positive/negative votes for the answer, then such counts may be updated. Moreover, confidence measures, e.g., strength of the mapping between the question and the answer, may be updated based on calculations performed by the answer change logic 394 as discussed hereafter.

The corpus information source monitor engine 390 analyzes the changes/updates implemented by these answer based transactions obtained from the sources in the corpus 345, and/or the new question/answer pairing provided by the QA system pipeline 300, to determine an updated strength (confidence measure) of the mapping of the previous answer to the question corresponding to the transaction, where the strength of the mapping is again based on an amount of evidence indicating that the answer is correct for the particular question, e.g., a relatively large number of thumbs up votes is indicative of a correct answer (stronger answer) while a relatively large number of thumbs down votes is indicative of an incorrect answer (weaker answer). Changes may be detected as a change in the number of positive/negative votes associated with the answer, e.g., thumbs up/down, likes/dislikes, re-tweets, or any other quantitative measure of positive/negative feedback regarding the answer. Thus, for example, transactions that are associated with the previously provided answer, such as via a transaction identifier, posting identifier, or other unique identifier, in which a thumbs up vote, thumbs down vote, or the like, may be received by the answer change logic 394, correlated with a corresponding entry in the data storage 393, and used to update the positive/negative counts as well as recalculate a strength value associated with the mapping of the previously generated answer to the question, e.g., thumbs up increases strength, thumbs down decreases strength.

Changes may also be detected by the answer change logic 394 by analyzing natural language comments provided in transactions referencing the previous answer and/or question. For example, comments provided in connection with the answer and/or question, again correlated by unique identifier such as a transaction identifier, which are provided in subsequent transactions, may be analyzed to identify keywords, key phrases, LAT, focus, or any other semantic or syntactic evidence of positive/negative reinforcement of the previous answer for the question. For example, a subsequent comment to a previously provided answer to a question may indicate that the answer was correct before but that there has been a change and the answer is no longer correct and the keywords and key phrases that are indicative of a change that renders the previous answer less correct than it was before may be identified. In such a case, the strength of the previous answer to question mapping should may be reduced according to a calculated amount.

In some illustrative embodiments, similar questions/answers provided in other portions of the corpus/corpora may be identified by the answer change logic 394 through natural language processing techniques and correlated with the question/answer pairing in the corresponding entry of the data storage 393. Similarity may be measured in terms of similar key words, similar key phrases, similar LAT, similar focus, similarity in concepts, etc. in one or both of the questions and the answers. Any known, or later developed, mechanism for identifying similar questions/answers may be used without departing from the spirit and scope of the illustrative embodiments.

In some illustrative embodiments, this identification of similar questions/answers is keyed to the input questions submitted to the QA system pipeline 300. That is, as new input questions are processed by the QA system pipeline 300, their question/answer pairings are provided to the corpus information source monitor engine 390 along with the extracted features generated by the QA system pipeline 300 when processing the input question, e.g., keywords, key phrases, LAT, focus, etc. These may then be compared to extracted features in entries in the data storage 393 to identify any question/answer pairs that have extracted features that match. Scoring may be performed to determine a degree of similarity such that the score may be compared to a threshold to determine if the questions match significantly enough to conclude that the questions are similar. The answers in the entry and the newly provided question/answer pair may be compared in a similar manner to determine a degree of similarity. If the answers are similar, then the strength of the mapping of the question and previous answer in the entry of the data structure 393 may be increased. If the answers are dissimilar, then the strength of the mapping of the question and the previous answer may be decreased.

Alternatively, or in addition, answer based transactions received from the corpus 345 may be the trigger for performing such comparisons. These transactions are tied to a previously provided answer and corresponding question in the corpus 345 itself. Thus, similar feature comparisons may be made with these questions/answers to determine a degree of similarity/difference and update the strength of mappings in the data storage 393 accordingly.

In some illustrative embodiments, temporal characteristics of transactions, e.g., timestamps associated with the transactions, newly submitted questions to the QA system pipeline 300, or the like, may be evaluated to determine the effect of changes to answers in the corpus/corpora. For example, based on the timestamps associated with the various answer based transactions received from the corpus 345, a determination may be made as to whether more time has elapsed since a positive change (increase in strength), e.g., a user providing positive feedback such as a "thumbs up" vote or the like, has been provided for a previously provided answer than a negative change (decrease in strength), e.g., a user providing negative feedback such as a "thumbs down" vote or the like. In such a case, the answer change logic 394 may determine that the trend of the question/answer pair in the entry of the data storage 393 is trending towards a reduction in the strength of the mapping of the question/ answer pair. Similarly, if a predetermined threshold period of time has elapsed since a last positive change to the answer was made by a subsequent transaction, then this may be indicative of a lessening of the strength of the question/answer mapping. Thus, temporal characteristics of transactions referencing the previously provided answer in the question/answer pair may be used as a further aspect for calculating a strength of the question/answer pair mapping.

The answer change logic 394 may utilize any one, or any combination, of these types of analysis to determine changes in the strength of mapping between the previously provided answer and the question without departing from the spirit and scope of the illustrative embodiments. Thus, one, a subset, or all of numerical counts of positive/negative votes, analysis of natural language comments for indications of positive/negative reinforcement of an answer, differences or similarities in answers for similar questions in different portions of the corpus/corpora, and temporal characteristics of transactions referencing the answer may be used to provide contributions to a calculation of the strength of the mapping between the answer and the question performed by the answer change logic 394. The calculation may utilize different weighting factors to be applied to each contributing part of the calculation as discussed previously.

The results of the analysis of the changes made by the transaction are quantified as either a positive or negative change in the strength of the mapping of the answer to the question. The measure of the strength of the mapping between the question and the previously provided answer to the question is then used by the previous transaction update logic 396 to determine whether the strength is relatively strong or weak. Strong and weak may be determined by comparison of the measure of strength to one or more threshold values. For example, if the measure of strength is equal to or below a threshold value, it may be determined to be relatively weak. As a result, the previous transaction update logic 396 may perform actions to inform users of the change in strength of the previous answer and/or propagate the change in the answer to other portions of the corpus 345 that reference the previously provided answer, thereby propagating the updated answer within the corpus. The new answer may be extracted from the natural language comments provided referencing the previous answer, as an opposite of a previous answer (such as when positive feedback turns negative), using a change in strength of an answer as a trigger to perform a search of a corpus for a new answer and using the new answer in the notification of the change and/or propagation of the change, or the like.

If the current strength is determined to be relatively weak, then the previous transaction update logic 396 may operate to retrieve a transaction history for the affected question/answer pair entry in the data storage 393, from the answer transaction tracking data storage 398. That is, as updates are made to the entry in the data storage 393, the transaction identifiers, user identifiers, or other unique identifiers corresponding to the source of the changes/updates is tracked in association with the entry in the data storage 393 by storing these unique identifiers of source of updates/changes in a linked entry in the answer transaction tracking data storage 398. Thus, when the strength of the mapping between the previously provided answer and the question falls equal to or below the threshold value, and is determined to be weak, the corresponding entry in the answer transaction tracking data storage 398 may be retrieved, the unique identifiers identified and used to perform actions to inform users and make changes within the corpus 345. It should be appreciated that other transactions that reference the previously provided answer may also be logged in the entry of the answer transaction tracking data storage 398 such that any reference to the previously provided answer may be accordingly updated when the strength of the mapping becomes weak. In this way, the corpus information source monitor engine 390 may identify previous answers to questions provided in the corpus/corpora that previously had a strong mapping between the question and the answer, and which currently has a relatively weak mapping between the question and answer due to additional transactions occurring referencing the answer to the question over time. Moreover, by propagating the change to the answer using the previous transaction update logic 396 and answer transaction tracking data storage 398, other portions of the corpus/corpora that make use of the answer, users that received the answer as a correct answer for the question, and the like, may be updated to reflect the current status of the question and answer mapping.

The actual actions that are taken by the previous transaction update logic 396 may take many different forms depending on the particular implementation including, but not limited to, changing the corpus/corpora itself in other places within the corpus/corpora so as to reflect the change in the answer to the question, sending notification messages to the users that referenced the previous answer to the question, such as via an instant message, electronic mail message, posting a message on an online forum, sending an environment wide message to all users of the change in the answer via a site-wide post on an electronic environment website, or the like.

In some illustrative embodiments, the notifications of the change in the answer may be accompanied with a request for users to confirm or refute the change. The confirmation/refute responses may be evaluated by the previous transaction update logic 396 to determine if the users of the previous answer agree with the change prior to the change being propagated within the corpus/corpora. If the response is a general confirmation, e.g., more confirmations than refutes, then the change may be propagated. If the response is a general refute of the change, then the change may not be propagated. If there is no clear indication either way, then the change may not be propagated but will undergo further development, potentially notifying an authorized user so that they can research the answer further and determine whether to propagate the new answer or not.

Thus, with the illustrative embodiments, mechanisms are provided for automatically detecting changes to answers provided within a corpus 345 and evaluating a strength of mapping between a previously provided answer and a question in view of these changes. In the event that the strength of the mapping falls below a predetermined level of acceptability as a correct answer for the question, the change in the answer may be automatically propagated throughout the corpus 345 and appropriate notifications may be sent to users that previously relied upon or referenced the previously provided answer to inform them of the change in the previously provided answer.

Figure 4:
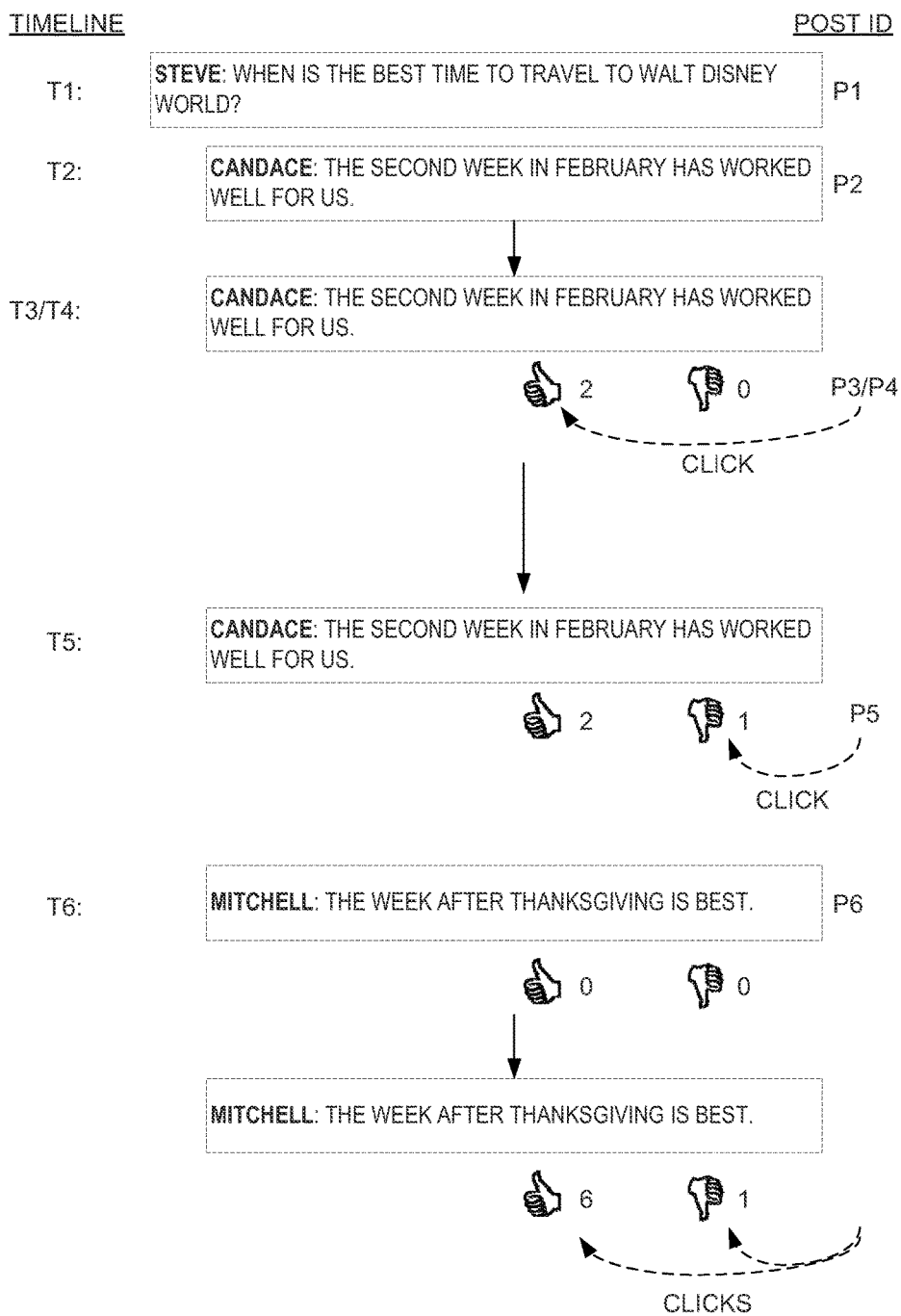
FIG. 4 is an example diagram illustrating a change in an answer in an information source and corresponding previous transaction based notification in accordance with an illustrative embodiment.

FIG. 4 is an example diagram illustrating a change in an answer in an information source and corresponding previous transaction based notification in accordance with an illustrative embodiment. In the example shown in FIG. 4, multiple users are part of an online community, such as an online forum or social networking website, in which the users are able to submit natural language text as messages or "posts" to an online electronic environment for viewing by other users and to which other user may respond with their own posts. The posts are handled as transactions with the electronic environment, e.g., the server or servers and corresponding software running on the server(s) that host the electronic environment.

It should be appreciated that the messages exchanged via the electronic environment are considered to be part of a corpus of information and thus, may be utilized by a cognitive system, QA system, or the like, when providing information to users of such cognitive systems, QA systems, or the like. For example, a user may submit a question to the QA system and the QA system may utilize the natural language messages exchanged via the electronic environment as a corpus of information that can potentially provide a hypothesis, or candidate answer, for the submitted question.

As shown, at a first time T1, a first user "Steve" submits a question, as part of a first post P1 (where P1 is considered to be the unique identifier for purposes of this description) to the other users of the electronic environment asking the question "When is the best time to travel to Walt Disney World?" At a time T2, a second user "Candace" submits an answer to Steve's question in a second post P2 with the answer being "The second week in February has worked well for us." At a third and fourth time T3 and T4, other users submit subsequent transactions P3, P4 where the users simply click a thumbs up user interface element to indicate their agreement with Candace's answer in post P2. At a fifth time T5, potentially much later than the previous posts, a user "Garrett" submits a thumbs down post P5 to indicate disagreement with the answer provided by Candace in post P2.

At still a sixth time T6, another user "Mitchell" provides his own answer in a post P6 indicating a different answer of "The week after Thanksgiving is best." Assume thereafter, that multiple additional postings are made by other users that give a thumbs up agreement with Mitchell's posting P6.

It should be noted that all of the postings P1-P6 are tied to one another via the unique identifier for the question posting and/or the answer posting, as indicated by the indented nature of the postings and also the association with the thumbs up and thumbs down icons with the answer posting. With this scenario, it can be seen that the trend for the answer provided by Candace in posting P2 is that the answer is less correct over time, i.e. the strength of the mapping between the answer "second week in February" and the question is weakening over time. This may be determined from the increase in thumbs down votes, the providing of an alternative answer to the same or similar question, and the increase in positive votes for the alternative answer, implying a corresponding increase in negative votes for the original answer provided by Candace. Moreover, the timing of the negative votes, the alternative answer, and the positive votes for the alternative answer is more recent than the original answer provided by Candace in post P2. All of these factors weight in favor of evaluation Candace's answer in post P2 as having a weak strength.

As a result of this determination, the mechanisms of the illustrative embodiments will determine that the strength of the mapping of the answer "second week in February" is weak, and that the change in answer should be propagated throughout the corpus and users that previously referenced this previous answer should be notified of the change. Accordingly, any references to this answer within the corpus may be automatically updated with the new answer and/or with a notification of the change. For example, if other forum topics have links, e.g., hyperlinks or the like, to the question/answer pair, these links may be updated to point to the new answer for the question, a message may be posted to the forum topic area informing users that the answer has changed, or the like.

Moreover, users may be sent notification messages informing them of this change in the answer. For example, a message of the type "Please note that the answer to the question 'When is the best time to travel to Walt Disney World?' has been updated and is now 'The week after Thanksgiving'" or the like, may be output on the electronic environment, sent via instant message, electronic mail message, or the like to the users directly, etc.

Figure 5:
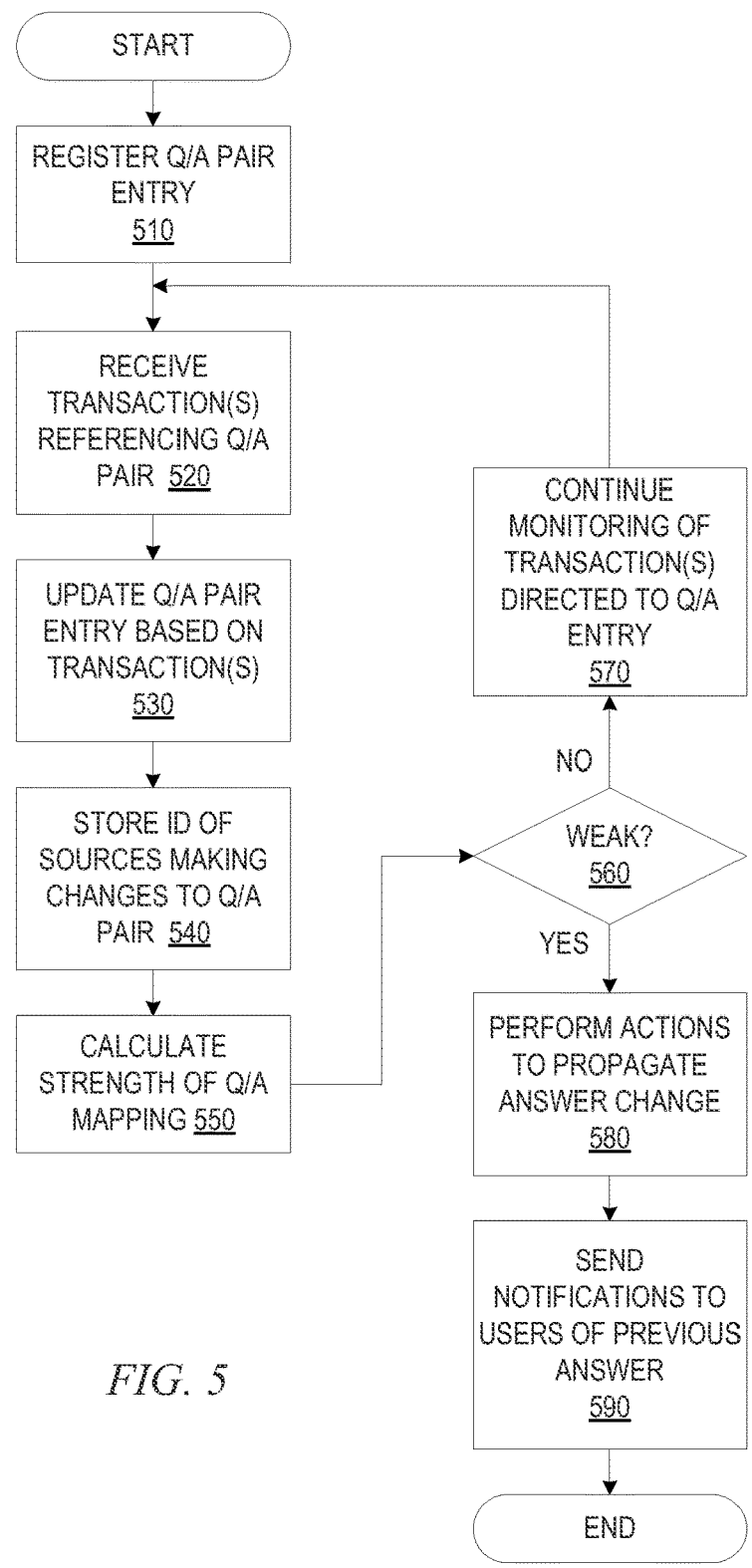
FIG. 5 is a flowchart outlining an example operation of a corpus information source monitoring engine in accordance with one illustrative embodiment.

FIG. 5 is a flowchart outlining an example operation of a corpus information source monitoring engine in accordance with one illustrative embodiment. As shown in FIG. 5, the operation starts with the registration of a question and previously provided answer pair entry in a question/answer pair data storage (step 510). One or more transactions are received that reference the question/answer pair (step 520). The question/answer pair data storage entry is updated to reflect changes to the question/answer pair identified in the transaction, if any (step 530). Identifiers of sources of the changes are stored in a previous transaction tracking data storage entry corresponding to the question/answer pair entry (step 540).

A strength of the mapping between the question and the previously provided answer is calculated based on the changes performed by the transaction(s) (step 550). A determination is made as to whether the strength of the mapping has become weak by comparing the calculated strength with one or more threshold values (step 560). If the strength of the mapping is still considered strong, monitoring for transactions directed to the question/answer pair is continued (step 570) with the operation returning to step 520 when subsequent transactions are received. If the strength of the mapping is determined to be weak (step 560), then actions are taken to propagate the change in the answer throughout the corpus of information in which the question and answer are provided (step 580) and to send notifications to users that previously referenced the previously provided answer to inform them of the change in the answer (step 590). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, for identifying changes, within a corpus of information, to answers to questions provided within the corpus of information, the method comprising:

configuring the data processing system to execute a corpus information source monitoring engine comprising question/answer mapping logic, answer change logic, and previous transaction update logic;

executing the corpus information source monitoring engine in the data processing system;

registering, by the question/answer mapping logic of the executing corpus information source monitoring engine, a mapping of a first question and a previously provided answer to the first question in a question/answer data structure;

receiving, by the answer change logic of the executing corpus information source monitoring engine, a transaction referencing the previously provided answer and having an update to the previously provided answer, wherein the transaction is a user input specifically directed to supporting or refuting the previously provided answer being a correct answer for the first question;

correlating, by the question/answer mapping logic, the transaction with the question answer data structure and updating the question/answer data structure at least by updating a measure of strength of the mapping of the first question to the previously provided answer based on the transaction;

determining, by the logic of the corpus information source monitoring engine, whether the strength of the mapping of the first question to the previously provided answer has fallen equal to or below a predetermined threshold, at least based on a calculation of the strength of the mapping as a weighted numerical calculation comprising quantified factors corresponding to temporal characteristics of transactions referencing the previously provided answer; and propagating, by the previous transaction update logic of the executing corpus information source monitoring engine, a change to the previously provided answer throughout the corpus of information in response to the strength of the mapping of the first question falling equal to or below the predetermined threshold, wherein the receiving the transaction referencing the previously provided answer comprises receiving a transaction referencing a second question that has similar features to that of the first question, and wherein the change to the previously provided answer is a different answer from that of the previously provided answer being provided as an answer to the second question.

2. The method of claim 1, wherein the first question and the previously provided answer to the first question are part of the corpus of information itself, and wherein the change to the previously provided answer is an update that is added to the corpus of information and is part of the corpus of information.

3. The method of claim 1, wherein more recent transactions are weighted more highly than older transactions in the quantified factors of the weighted numerical calculation.

4. The method of claim 1, wherein the propagating the change to the previously provided answer throughout the corpus of information comprises:

maintaining, for each transaction referencing the previously provided answer, a tracking record in a tracking data structure to track utilization of the previously provided answer;

traversing the tracking data structure to identify transactions that utilized the previously provided answer; and propagating the change based on the identified transactions in the tracking data structure.

5. The method of claim 1, wherein the propagating the change to the previously provided answer throughout the corpus of information further comprises sending a notification to one or more computing devices associated with users that viewed the previously provided answer, wherein the notification informs the users of the change to the previously provided answer.

6. The method of claim 1, wherein the receiving the transaction referencing the previously provided answer and having the update to the previously provided answer comprises receiving a transaction report message, from an agent deployed in a computing device of an information source, which identifies the transaction as referencing the previously provided answer, the previously provided answer being associated with a previous transaction identifier.

7. The method of claim 1, wherein the determining whether the strength of the mapping of the first question to the previously provided answer, based on the update to the question/answer data structure, has fallen equal to or below the predetermined threshold comprises calculating the strength of the mapping of the first question to the previously provided answer as the weighted numerical calculation which further comprises quantified factors corresponding to one or more of:

numerical counts of positive/negative votes associated with the previously provided answer, analysis of natural language comments for indications of positive negative reinforcement of the previously provided answer, or differences or similarities in one or more answers for one or more similar other questions in different portions of the corpus of information.

8. The method of claim 1, wherein the data processing system implements a question and answer (QA) system, and wherein the mapping of the question to the previously provided answer is generated by the QA system.

9. The method of claim 1, wherein the change to the previously provided answer is propagated throughout the corpus of information without re-processing the question to generate the change in the previously provided answer.

10. A computer program product comprising a computer readable storage medium having a computer readable program stored therein, wherein the computer readable program, when executed on a computing device, configures the computing device to execute a corpus information source monitoring engine comprising question/answer mapping logic, answer change logic, and previous transaction update logic, and causes the computing device to:

execute the corpus information source monitoring engine in the data processing system;

register, by the question/answer mapping logic of the executing corpus information source monitoring engine, a mapping of a first question and a previously provided answer to the first question in a question/answer data structure;

receive, by the answer change logic of the executing corpus information source monitoring engine, a transaction referencing the previously provided answer and having an update to the previously provided answer, wherein the transaction is a user input specifically directed to supporting or refuting the previously provided answer being a correct answer for the first question;

correlate, by the question/answer mapping logic, the transaction with the question answer data structure and updating the question/answer data structure at least by updating a measure of strength of the mapping of the first question to the previously provided answer based on the transaction;

determine, by the logic of the corpus information source monitoring engine, whether the strength of the mapping of the first question to the previously provided answer has fallen equal to or below a predetermined threshold, at least based on a calculation of the strength of the mapping as a weighted numerical calculation comprising quantified factors corresponding to temporal characteristics of transactions referencing the previously provided answer; and propagate, by the previous transaction update logic of the executing corpus information source monitoring engine, a change to the previously provided answer throughout the corpus of information in response to the strength of the mapping of the first question falling equal to or below the predetermined threshold, wherein the computer readable program further causes the computing device to receive the transaction referencing the previously provided answer at least by receiving a transaction referencing a second question that has similar features to that of the first question, and wherein the change to the previously provided answer is a different answer from that of the previously provided answer being provided as an answer to the second question.

11. The computer program product of claim 10, wherein the first question and the previously provided answer to the first question are part of the corpus of information itself, and wherein the change to the previously provided answer is an update that is added to the corpus of information and is part of the corpus of information.

12. The computer program product of claim 10, wherein more recent transactions are weighted more highly than older transactions in the quantified factors of the weighted numerical calculation.

13. The computer program product of claim 10, wherein the computer readable program further causes the computing device to propagate the change to the previously provided answer throughout the corpus of information at least by:

maintaining, for each transaction referencing the previously provided answer, a tracking record in a tracking data structure to track utilization of the previously provided answer;

traversing the tracking data structure to identity transactions that utilized the previously provided answer; and propagating the change based on the identified transactions in the tracking data structure.

14. The computer program product of claim 10, wherein the computer readable program further causes the computing device to propagate the change to the previously provided answer throughout the corpus of information further at least by sending a notification to one or more computing devices associated with users that viewed the previously provided answer, wherein the notification informs the users of the change to the previously provided answer.

15. The computer program product of claim 10, wherein the computer readable program further causes the computing device to receive the transaction referencing the previously provided answer and having the update to the previously provided answer at least by receiving a transaction report message, from an agent deployed in a computing device of an information source, which identifies the transaction as referencing the previously provided answer, the previously provided answer being associated with a previous transaction identifier.

16. The computer program product of claim 10, wherein the computer readable program further causes the computing device to determine whether the strength of the mapping of the first question to the previously provided answer based on the update to the question/answer data structure has fallen equal to or below the predetermined threshold at least by calculating the strength of the mapping of the first question to the previously provided answer as the weighted numerical calculation which further comprises quantified factors corresponding to one or more of:

numerical counts of positive/negative votes associated with the previously provided answer, analysis of natural language comments for indications of positive/negative reinforcement of the previously provided answer, or differences or similarities in one or more answers for one or more similar other questions in different portions of the corpus of information.

17. An apparatus comprising:
a processor; and
a memory coupled to the processor, wherein the memory comprises instructions which, when executed by the processor, configures the processor to execute a corpus information source monitoring engine comprising question/answer mapping logic, answer change logic, and previous transaction update logic, and causes the processor to:

execute the corpus information source monitoring engine in the data processing system;

register, by the question answer mapping logic of the executing corpus information source monitoring engine, a mapping of a first question and a previously provided answer to the first question in a question/answer data structure;

receive, by the answer change logic of the executing corpus information source monitoring engine, a transaction referencing the previously provided answer and having an update to the previously provided answer, wherein the transaction is a user input specifically directed to supporting or refuting the previously provided answer being a correct answer for the first question;

correlate, by the question/answer mapping logic, the transaction with the question/answer data structure and updating the question/answer data structure at least by updating a measure of strength of the mapping of the first question to the previously provided answer based on the transaction;

determine, by the logic of the corpus information source monitoring engine, whether the strength of the mapping of the first question to the previously provided answer, has fallen equal to or below a predetermined threshold, at least based on a calculation of the strength of the mapping as a weighted numerical calculation comprising quantified factors corresponding to temporal characteristics of transactions referencing the previously provided answer; and propagate, by the previous transaction update logic of the executing corpus information source monitoring engine, a change to the previously provided answer throughout the corpus of information in response to the strength of the mapping of the first question falling equal to or below the predetermined threshold, wherein the instructions further cause the processor to receive the transaction referencing the previously provided answer at least by receiving a transaction referencing a second question that has similar features to that of the first question, and wherein the change to the previously provided answer is a different answer from that of the previously provided answer being provided as an answer to the second question.

\* \* \* \* \*